United States Patent
Park

(10) Patent No.: US 8,823,836 B2
(45) Date of Patent: Sep. 2, 2014

(54) DIGITAL PHOTOGRAPHING APPARATUS AND METHOD OF CONTROLLING THE SAME

(75) Inventor: Sung-ha Park, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 15 days.

(21) Appl. No.: 13/239,973

(22) Filed: Sep. 22, 2011

(65) Prior Publication Data

US 2012/0081573 A1 Apr. 5, 2012

(30) Foreign Application Priority Data

Oct. 1, 2010 (KR) .................. 10-2010-0095963

(51) Int. Cl.
*H04N 5/262* (2006.01)
*H04N 5/222* (2006.01)
*H04N 5/76* (2006.01)
*G06K 9/00* (2006.01)

(52) U.S. Cl.
USPC .............. 348/239; 348/333.05; 348/231.3; 348/231.99; 348/231.1; 382/118

(58) Field of Classification Search
CPC ......... H04N 5/222; H04N 5/262; H04N 5/76; G06K 9/00
USPC ............ 348/333.01, 231.3, 231.1, 231.9, 348/231.99, 239, 333.05, 231.2; 382/118, 382/162, 276, 309
See application file for complete search history.

(56) References Cited

U.S. PATENT DOCUMENTS

| | | |
|---|---|---|
| 6,680,749 B1* | 1/2004 | Anderson et al. ........ 348/231.99 |
| 2008/0307307 A1* | 12/2008 | Ciudad et al. ................. 715/719 |
| 2009/0167873 A1* | 7/2009 | Sakaue et al. .............. 348/207.2 |

FOREIGN PATENT DOCUMENTS

KR 10-2010-0111092 A 10/2010

* cited by examiner

*Primary Examiner* — Tuan Ho
*Assistant Examiner* — Marly Camargo
(74) *Attorney, Agent, or Firm* — Drinker Biddle & Reath LLP

(57) ABSTRACT

A digital photographing apparatus includes a digital signal processing unit that obtains first image data from an input image and generates second image data using the first image data according to a condition that is previously set. A method of controlling a digital photographing apparatus includes obtaining first image data from an input image and generating second image data using the first image data according to a condition that is previously set.

19 Claims, 8 Drawing Sheets

DIGITAL PHOTOGRAPHING APPARATUS AND METHOD OF CONTROLLING THE SAME

CROSS-REFERENCE TO RELATED PATENT APPLICATION

This application claims the priority benefit of Korean Patent Application No. 10-2010-0095963, filed on Oct. 1, 2010, in the Korean Intellectual Property Office, the entire disclosure of which is incorporated herein by reference.

BACKGROUND

1. Field of the Invention

Embodiments relate to a digital photographing apparatus and a method of controlling the same.

2. Description of the Related Art

Recently, digital photographing apparatuses not only have a function for capturing an image but also have a function for generating various effects and fun images.

In such a digital photographing apparatus, after an image is captured, a main image is played back, or images obtained by applying various effects to the captured image by using an after correction mode are displayed. The images may be individually selected and checked.

SUMMARY

Embodiments can provide a digital photographing apparatus that may generate a main image and images obtained by applying various effects selected by a user to the main image through a single instance of photographing.

According to an embodiment, there is provided a method of controlling a digital photographing apparatus. The method includes obtaining first image data from an input image and generating second image data using the first image data according to a condition that is previously set.

The condition that is previously set may be a multi-effect image set according to a selection by a user.

The method may further include displaying a multi-effect image setting menu.

The displaying of the multi-effect image setting menu may include displaying a display area of the digital photographing apparatus by dividing the display area into a first area and a second area, displaying one or more multi-effect images selectable by the user in the first area, and displaying in the second area one or more images selected by the user from among the one or more multi-effect images displayed in the first area.

The displaying of the multi-effect image setting menu may include displaying the multi-effect images selectable by a user by grouping the multi-effect images according to a category.

The second image data may be a thumbnail image generated according to the condition that is previously set.

The method may further include generating a first thumbnail image from the obtained first image data, generating a second thumbnail image according to the condition that is previously set from the first thumbnail image, and storing one or more of the first image data, the first thumbnail image, and the second thumbnail image.

The method may further include displaying the first thumbnail image and the second thumbnail image, wherein the displaying includes displaying a display area of the digital photographing apparatus by dividing the display area into a first area and a second area, displaying the first thumbnail image in the first area, and displaying the second thumbnail image in the second area.

The second thumbnail image may be displayed in the second area with respect to the first thumbnail image displayed in the first area, according to a selection of a user.

The method may further include generating a first thumbnail image from the obtained first image data, storing information about the condition that is previously set in an EXIF of the first image data, and when the first image data and the first thumbnail image are displayed, generating a second thumbnail image from the first thumbnail image according to the information about the condition that is previously set.

The method may further include storing position information of the generated second thumbnail image in the EXIF of the first image data.

The method may further include storing the first image data and the second image data as one image file.

A resolution of the first image data may be greater than that of the second image data.

According to another embodiment, there is provided a method of controlling a digital photographing apparatus. The method includes selecting one or more multi-effect images, obtaining first image data from an input image, generating one or more second image data using the first image data according to the one or more selected multi-effect images, and generating the first image data and the one or more second images as one multi picture file.

According to another embodiment, there is provided a digital photographing apparatus. The digital photographing apparatus includes a digital signal processing unit that obtains first image data from an input image and generates second image data using the first image data according to a condition that is previously set.

The digital signal processing unit may include a multi-effect image setting unit that sets a multi-effect image according to a user's selection.

The digital signal processing unit may include a control unit that controls displaying of a display area of the digital photographing apparatus by dividing the display area into a first area and a second area, displaying of multi-effect images selectable by a user in the first area, and displaying of in the second area one or more images selected by the user from among the multi-effect images displayed in the first area.

The digital signal processing unit may include a thumbnail generating unit that generates the second image data as a thumbnail image from the first image data according to the condition that is previously set.

The digital signal processing unit may include a thumbnail generating unit that generates a first thumbnail image from the obtained first image data and that generates a second thumbnail image according to the condition that is previously set from the first thumbnail image, and a control unit that controls storing of one or more of the first image data, the first thumbnail image, and the second thumbnail image.

The control unit may control displaying of one or more of the first thumbnail image and the second thumbnail image, displaying of a display area of the digital photographing apparatus divided into a first area and a second area, and displaying of the first thumbnail image in the first area and the second thumbnail image the second area.

BRIEF DESCRIPTION OF THE DRAWINGS

The above and other features and advantages will become more apparent by describing in detail exemplary embodiments with reference to the attached drawings in which.

DETAILED DESCRIPTION

Figure 1:
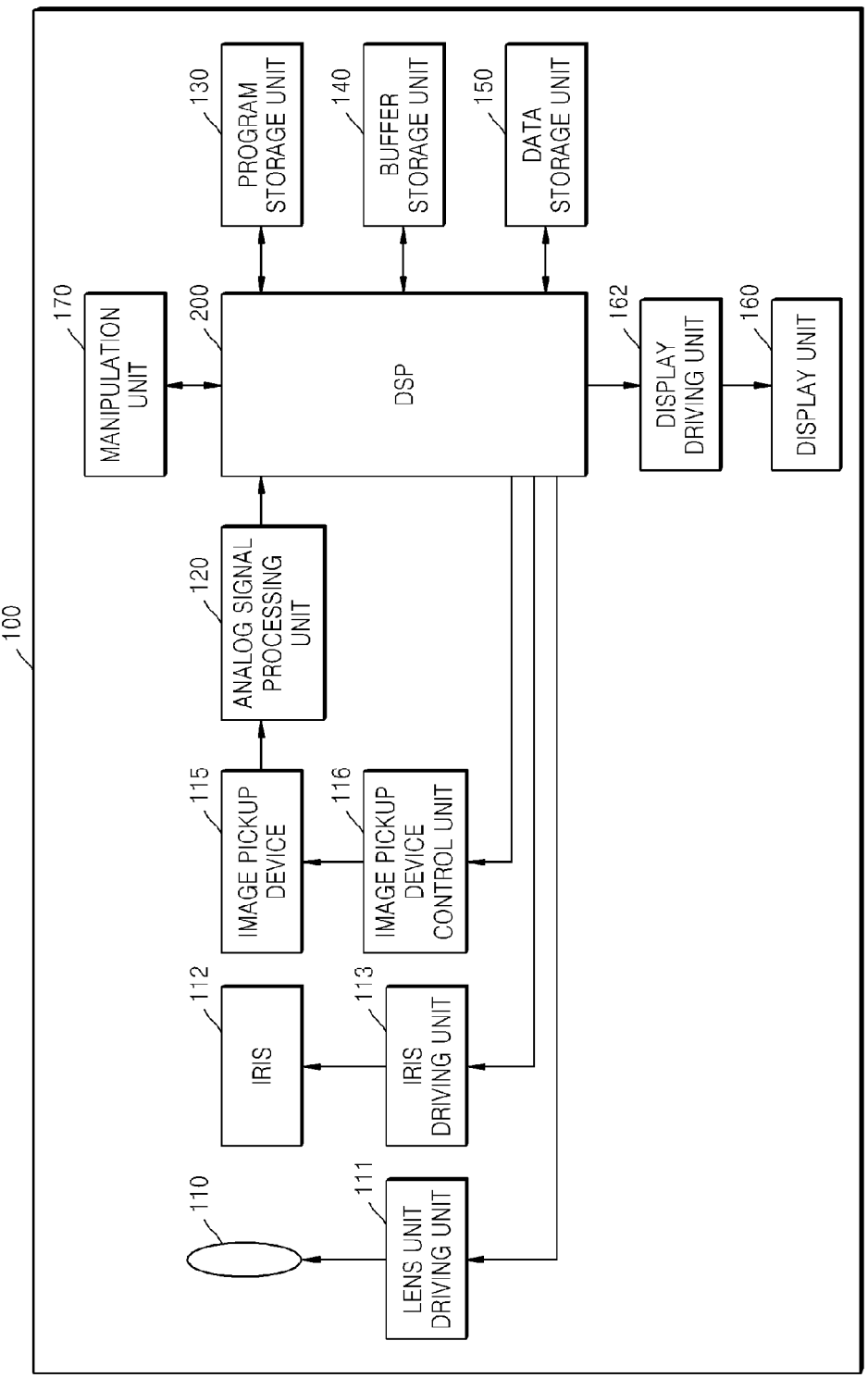
FIG. 1 is a schematic block diagram of a digital photographing apparatus according to an embodiment.

Embodiments are described more fully with reference to the accompanying drawings, in which exemplary embodiments are shown. In the description, the detailed descriptions of well-known functions and structures may be omitted so as not to hinder the understanding of embodiments.

Also, though terms like a first and a second are used to describe various elements, components, areas, layers, and/or portions in various embodiments, the elements, components, areas, layers, and/or portions should not be limited by these terms. These terms are only used to distinguish one element, component, area, layer, or portion from another.

The terminology used herein is for the purpose of describing particular embodiments only and is not intended to be limiting of example embodiments. As used herein, the singular forms "a," "an," "the," and similar referents in the context of describing the invention are intended to include both the singular and the plural forms as well, unless the context clearly indicates otherwise. It will be further understood that the terms "comprises," "comprising," "includes," "including," "has," and "having" as used herein are specifically intended to be read as open-ended terms of art such that they specify the presence of stated features, integers, steps, operations, elements, and/or components, but do not preclude the presence or addition of one or more other features, integers, steps, operations, elements, components, and/or groups thereof.

In the drawings, like reference numerals can designate like elements throughout the specification. For convenience and accuracy, repeated explanation of overlapping features may not be given.

FIG. 1 is a schematic block diagram illustrating a digital photographing apparatus, according to an embodiment. A digital camera 100 is described as an example of the digital photographing apparatus. However, the digital photographing apparatus is not limited to the digital camera 100 illustrated in FIG. 1, and the digital photographing apparatus may be any one of various digital apparatuses, such as a personal digital assistant (PDA), a portable multimedia player (PMP), or the like.

The digital camera 100 may include a lens unit 110, a lens unit driving unit 111, an iris 112, an iris driving unit 113, an image pickup device 115, an image pickup device control unit 116, an analog signal processing unit 120, a program storage unit 130, a buffer storage unit 140, a data storage unit 150, a display driving unit 162, a display unit 160, a digital signal processing unit 200, and a manipulation unit 170. In this regard, the lens unit 110, the lens unit driving unit 111, the iris 112, the iris driving unit 113, the image pickup device 115, the image pickup device control unit 116, and the analog signal processing unit 120 may be referred to as an image pickup unit.

The lens unit 110 can obtain an optical signal. The lens unit 110 may include a zoom lens that can widen or narrow a viewing angle according to a focal length of the lens unit 110 and a focus lens that can focus on a subject. Each of the zoom lens and the focus lens may be formed as a single lens or a group of a plurality of lenses.

The iris 112 can adjust the amount of light incident on the image pickup device 115 by adjusting an amount of opening of the iris 112.

The lens unit driving unit 111 and the iris driving unit 113 can receive control signals from the digital signal processing unit 200. The lens unit driving unit 111 and the iris driving unit 113 can, respectively, drive the lens unit 110 and the iris 112. The lens unit driving unit 111 can adjust the focal length of the lens unit 110 by adjusting a position of the lens unit 110 and can perform auto focusing, zoom changing, focus changing, and the like. The iris driving unit 113 can adjust the opening amount of the iris 112 and can perform auto focusing, automatic exposure adjustment, focus changing, field depth adjustment, and the like by adjusting an F number or an iris value.

The optical signal passing through the lens unit 110 can reach a light-receiving surface of the image pickup device 115 and can form an image of the subject. The image pickup device 115 may be a charge coupled device (CCD), a complementary metal oxide semiconductor image sensor (CIS), or a high-speed image sensor that can convert the optical signal into an electric signal. Sensitivity of the image pickup device 115 may be controlled by the image pickup device control unit 116. The image pickup device control unit 116 may control the image pickup device 115 according to a control signal that can be manually inputted by a user's manipulation or a control signal that can be automatically generated in response to an image signal that is inputted in real time.

An exposure time of the image pickup device 115 can be adjusted by using a shutter (not shown). The shutter may be a mechanical shutter that can adjust the amount of light incident on the image pickup device 115 by moving a lens shade up and down or an electronic shutter that can adjust the amount of incident light by applying an electric signal to the image pickup device 115.

The analog signal processing unit 120 can perform noise reduction, gain control, waveform shaping, analog-digital conversion, and the like on an analog signal applied from the image pickup device 115.

The manipulation unit 170 can perform inputting of a control signal from an external source, for example, from a user. The manipulation unit 170 may include a shutter-release button that can input a shutter-release signal for photographing by exposing the image pickup device 115 to light for a predetermined period of time, a power button that can input a control signal for controlling ON/OFF of power, a wide angle-zoom button and a telephoto-zoom button respectively for widening and narrowing a viewing angle according to a user's input, and various function buttons that can perform text inputting, selection of a mode such as a photographing mode or a playback mode, selection of a white balance setting function, selection of an exposure setting function, and the like. The manipulation unit 170 may have any one of various button shapes, but embodiments are not limited thereto. For example, the manipulation unit 170 may have any shape that may accept a user input, for example, a keyboard, a touch pad, a touch screen, a remote controller, and the like.

The digital camera 100 can include the program storage unit 130 that can store programs of, for example, operating and application systems, the buffer storage unit 140 that can temporarily store data necessary for various operations and result data of various operations, and the data storage unit 150 that can store various types of data necessary for the programs, for example, image files including image signals.

The digital camera 100 can include the display unit 160 that can display an operation state of the digital camera 100 or image data captured by the digital camera 100. The display unit 160 may provide visual information and/or audible information to the user. In order to provide visual information to the user, the display unit 160 may include a liquid crystal display (LCD) panel or an organic light-emitting display (OLED) panel. The display driving unit 162 can provide driving signals to the display unit 160.

The digital camera 100 can include the digital signal processing unit 200 that can process an input image signal and can control each element of the digital camera 100 according to the input image signal or an external input signal. The digital signal processing unit 200 may reduce noise in input image data and can perform image signal processing for image quality improvement, such as gamma correction, color filter array interpolation, color matrix, color correction, or color enhancement. The digital signal processing unit 200 may generate an image file by compressing image data that can be generated by the image signal processing for image quality improvement and can restore the image data from the image file. The image data may be reversibly or irreversibly compressed in a joint photographic experts group (JPEG) format or a JPEG2000 format. The compressed data may be stored in the data storage unit 150. The digital signal processing unit 200 may perform sharpening, color processing, blur processing, edge emphasis, image analysis, image recognition, image effect processing, or the like. Image recognition may include face recognition and scene recognition. For example, the digital signal processing unit 200 may perform image synthesis such as brightness adjustment, color correction, contrast adjustment, outline emphasis, screen split, or character image generation.

Also, the digital signal processing unit 200 may execute the programs stored in the program storage unit 130. The digital signal processing unit 200 may generate a control signal that can control auto focusing, zoom change, focus change, automatic exposure correction, and the like by using a separate module. The digital signal processing unit 200 may provide the control signal to the lens unit driving unit 111, the iris driving unit 113, and the image pickup device control unit 116 and can control operations of the elements included in the digital camera 100 such as the shutter and a flash.

Figure 2:
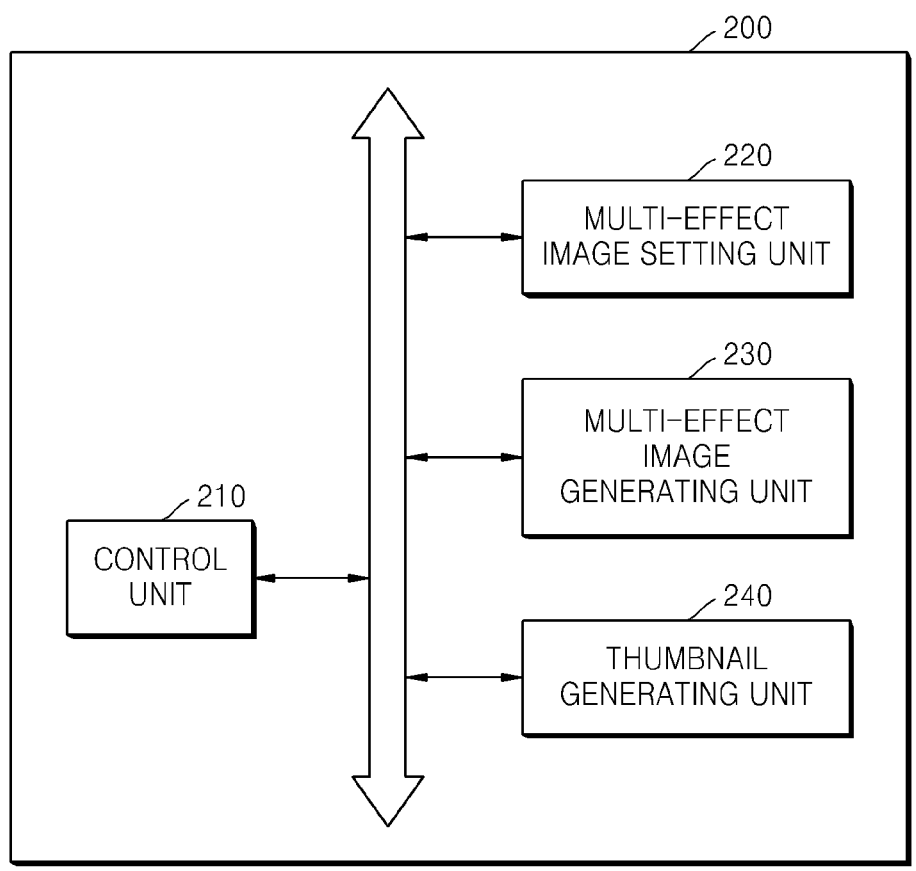
FIG. 2 is a block diagram of a digital signal processing unit of the digital photographing apparatus illustrated in FIG. 1.

FIG. 2 is a detailed block diagram illustrating the digital signal processing unit 200 of FIG. 1.

Referring to FIG. 2, the digital signal processing unit 200 can include a control unit 210, a multi-effect image setting unit 220, a multi-effect image generating unit 230, and a thumbnail generating unit 240. In the current embodiment, the digital signal processing unit 200 can obtain first image data from an image inputted by the image pickup device 115 and can generate second image data using the first image data according to a condition that is previously set. In this regard, the first image data can be a captured main image, and the second image data can be a multi-effect image generated according to a multi-effect that can be previously set by a user. In this regard, the second image data may be a plurality of effect images according to a number of multi-effects that can be set by a user. In addition, the multi-effect may include various image processing effects, such as Sepia for changing an image to a brown tone, Negative for reversing color and brightness of an image, Black&White for changing an image to monochrome or black-and-white, a function that can make an image thin or thick, a function that can allow an image to be shown as a painting by increasing brightness, a function that can increase a length of an image, a function that can increase a width of an image, a function that can perform a mosaic processing on an image, and the like. However, embodiments are not limited thereto. As described above, according to the current embodiment, not only can an original image be obtained through a single instance of photographing, but also images formed by applying various effects to the original image may be obtained through a single instance of photographing. In addition, the current embodiment can provide an interface that may be convenient for setting images having such a multi-effect. The interface concerning the setting of the multi-effect is described below with reference to FIGS. 3 and 4.

The control unit 210 can control the overall operation of the digital signal processing unit 200.

The multi-effect image setting unit 220 can set a multi-effect image according to a user's selection. In this regard, the user can set the multi-effect image through the manipulation unit 170.

The multi-effect image generating unit 230 can generate multi-effect image data from image data obtained according to a set condition, for example, the multi-effect image selected by the user.

The thumbnail generating unit 240 can generate a thumbnail image by reducing a size of the obtained image. In addition, the thumbnail generating unit 240 may generate a multi-effect thumbnail image from the thumbnail image. In this regard, the multi-effect thumbnail image can be a thumbnail image of the multi-effect image and can be generated from the thumbnail image.

The control unit 210 may display a menu that can set the multi-effect image on the display unit 160 before photographing.

Figure 3:
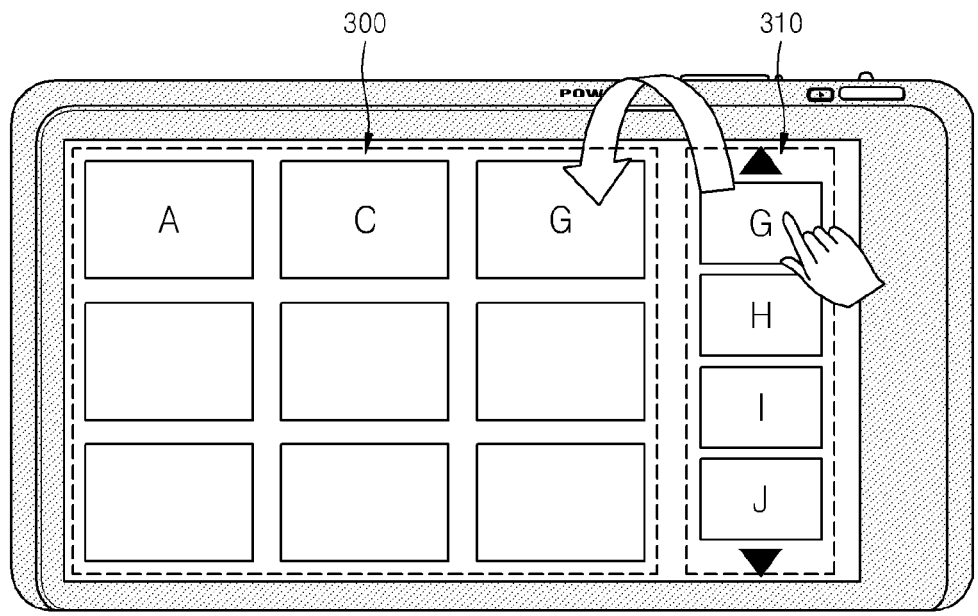
FIGS. 3 and 4 are rear elevational views of a digital photographing apparatus, according to embodiments.

FIG. 3 illustrates an example of a multi-effect image setting screen of the display unit 160 of the digital camera 100 according to an embodiment.

A display screen can be divided into an area 310 and an area 300. The area 310 can display images G, H, I, and J that can represent multi-effects so that a user may select the multi-effects provided by the digital camera 100. The area 300 can display multi-effect images selected by the user in the area 310. In this regard, the multi-effect images may include Sepia, Black&White, Negative, and various fun images. The fun images may be an image including polka dots, a heart-shaped image, or an image including star-shaped patterns. The user may obtain fun and unique images from among the fun images by performing a single instance of photographing. As illustrated in FIG. 3, the multi-effect image G selected in the area 310 may be moved to the area 300. In the area 300, three multi-effect images A, C, and G selected by a user can be set. Accordingly, a single main image and three multi-effect images obtained by applying effects selected by a user, for example, Sepia A, Black&White C, and Negative G, may be generated through a single instance of photographing. In this regard, the selection of the multi-effect images may be performed by a drag and drop operation, but embodiments are not limited thereto.

A single instance of photographing can mean obtaining a single main image corresponding to a photographing operation. Therefore, obtaining a three-dimensional (3D) image using a dual lens in a 3D camera may be a single instance of photographing. For example, an operation for obtaining a single captured image may be performed using one lens and one sensor like in a general photographing apparatus, may be performed using two lenses and two sensors like in a 3D photographing apparatus, or may be performed using two lenses and one sensor.

Figure 4:
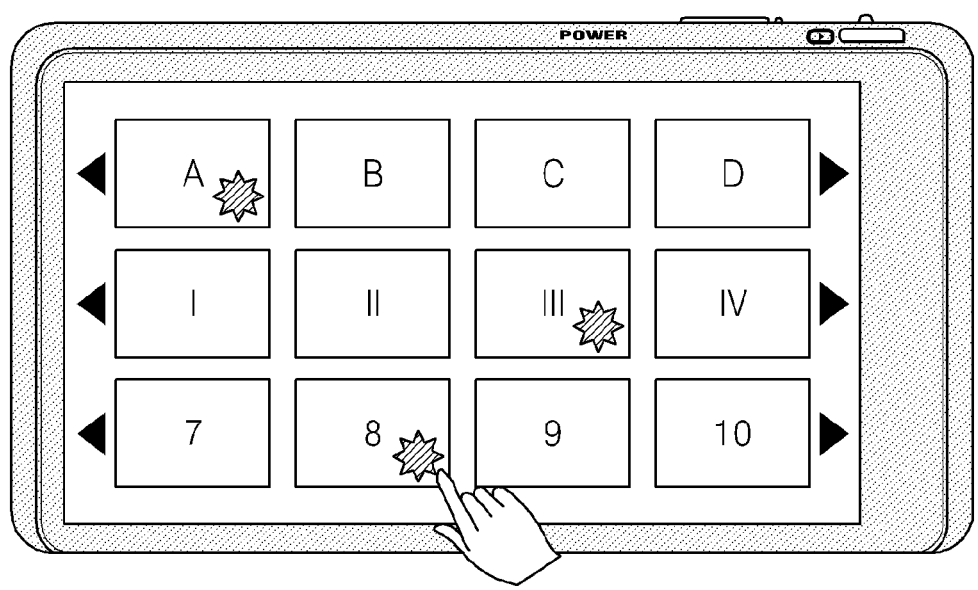

FIG. 4 illustrates a multi-effect image setting screen of the display unit 160 of the digital camera 100, according to another embodiment.

In FIG. 4, multi-effect images can be grouped by category and can be displayed on a screen. A user can select the multi-effect images by category. In this regard, a row indicated by alphabet letters can represent effects, for example, Sepia, Black&White, and Negative. A row indicated by Roman numerals may represent fun images using, for example, various compositions. A row indicated by numbers may represent image transformation effects such as Thin or Thick. As illustrated in FIG. 4, a user may select multi-effects A, III, and 8, and may generate multi-effect images according to the selected multi-effects.

Figure 5:
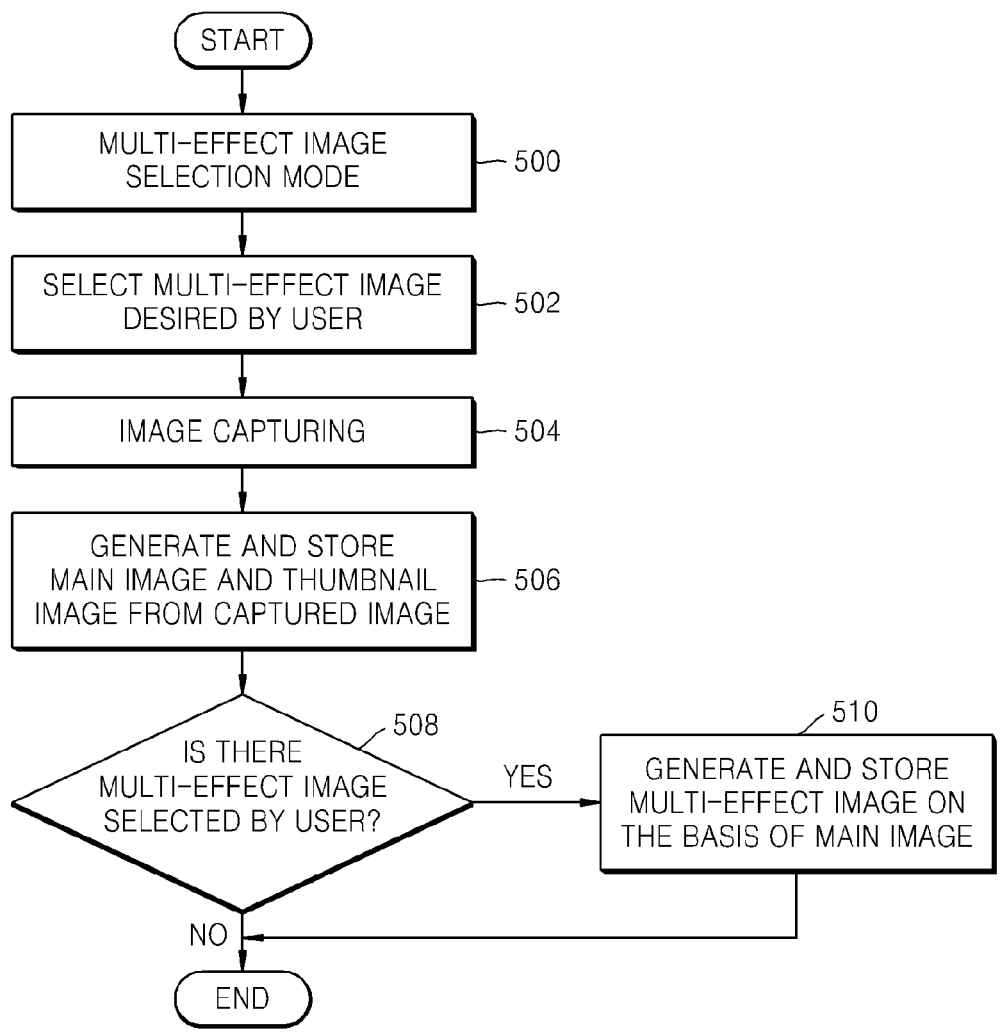
FIG. 5 is a flowchart of a method of controlling a digital photographing apparatus, according to an embodiment.

FIG. 5 is a flowchart of a method of controlling a digital photographing apparatus, according to an embodiment.

Referring to FIG. 5, in Operation 500, a multi-effect image selection mode can be set. In Operation 502, a user can select a desired multi-effect image. As described above with reference to FIGS. 3 and 4, the user can obtain not only a main image but also images having various effects that a user can additionally desire to obtain, through a single instance of photographing.

In Operation 504, an input image can be captured. In this regard, a present input image can be captured according to a photographing signal for the input image.

In Operation 506, a main image and a thumbnail image can be generated from the captured image, and the main image and the generated thumbnail image can be stored. In this regard, the main image and the thumbnail image can be stored in the data storage unit 150 to generate a multi-effect image. However, embodiments are not limited thereto. For example, the main image and the thumbnail image can be stored in a recording medium (not shown) and can then be read again. The read main image and the read thumbnail image may be used when generating the multi-effect image.

In Operation 508, it can be determined whether a user has selected a multi-effect image. If a user has selected a multi-effect image, the multi-effect image can be generated using the main image and can then be stored in the recording medium in Operation 510. In this regard, all multi-effect images selected by a user can be generated and can be stored in the recording medium.

Although not shown in FIG. 5, if the user has not selected a multi-effect image, an existing main image and an existing thumbnail image can be stored in the recording medium (not shown). Then, the digital photographing apparatus can return to a preview state and can wait for a next photographing signal.

The thumbnail generating unit 240 can generate a first thumbnail image from the obtained first image data and then can generate a second thumbnail image from the generated first thumbnail image according to a condition that is previously set.

The control unit 210 can control the digital photographing apparatus to store the first image data, the first thumbnail image, and the second thumbnail image in the recording medium (not shown).

In this regard, multi-effect images selected by the user can be generated into thumbnail images in order to manage memory. Thus, all multi-effect images selected by the user can be generated and stored. That is, if the user selects four multi-effects to generate in addition to a main image generated by photographing, five pieces of image data can be generated and stored in total. This has an advantage in that the user may obtain a plurality of images including a main image and images having multi-effects previously selected by a user with every instance of photographing without having to additionally manipulate each of the captured images. However, a sufficient storage capacity, for example, a memory card, should be provided, and an effective managing method may be required to manage the file or files.

If the main image captured by the user is, for example, SG108000.JPG, a SG108000 file can include the main image and a thumbnail image. If the user selects four multi-effects, then there can be five image files or SG108000.JPG through SG108004.JPG. If one piece of image data has a size of about 3 MB, a multi-effect image generated using the image data can also have a size of 3 MB. Thus, the required storage capacity would be about 15 MB. That is, the image files for SG108000.JPG, SG108001.JPG, SG108002.JPG, SG108003.JPG, and SG108004.JPG may be individual image files structurally.

Accordingly, for the example described, a storage capacity of 15 MB can be used in a single instance of photographing. In addition, since five images can be generated in every instance of photographing, 250 images may be stored in a digital camera performing 50 instances of photographing. Thus, an additional measure for managing a user's files may be required. Accordingly, in the current embodiment, a thumbnail image can be used for file management, and the following embodiments regarding file management are provided.

Figure 6:
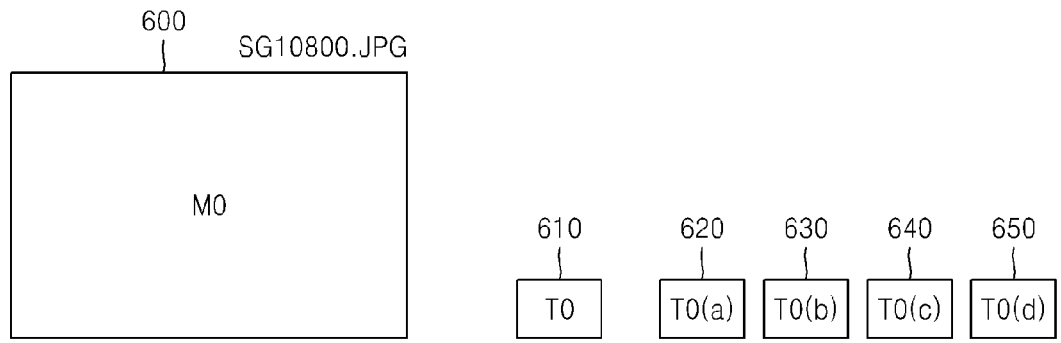
FIG. 6 is a schematic of a method of managing image data, according to an embodiment.

A first embodiment for file management can include generation of sub-thumbnail images with respect to a main thumbnail image. Referring to FIG. 6, SG108000.JPG can be an image file having a plurality of thumbnail images. An M0 600 can be a main image, and a T0 610 can be a thumbnail image with respect to the main image. A T0(a) 620, a T0(b) 630, a T0(c) 640, and a T0(d) 650 can be multi-effect images selected by a user and can be made using the main thumbnail image T0 610.

Figure 7:
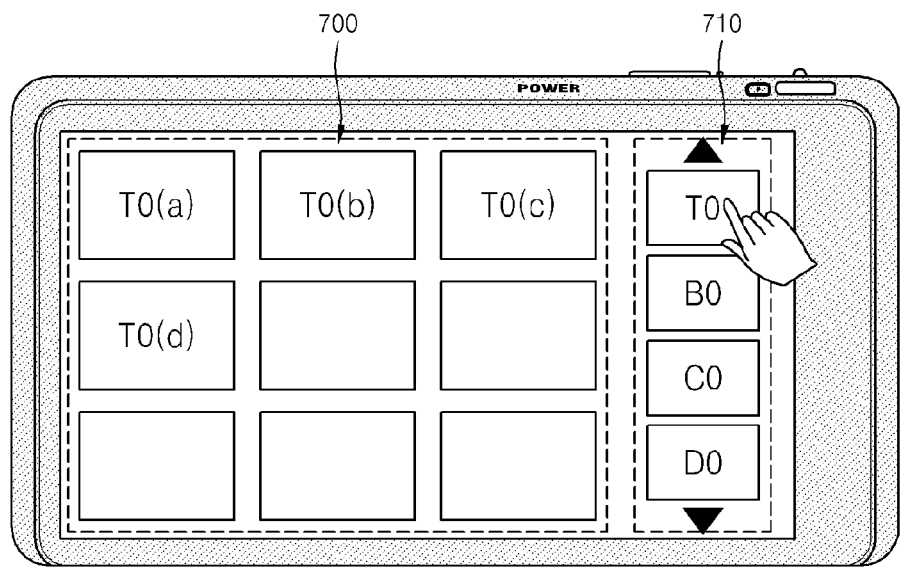
FIG. 7 is a rear elevational view of a digital photographing apparatus, according to an embodiment.

A method of displaying multi-effect images is described with reference to FIG. 7. Referring to FIG. 7, a left area 700 can display multi-effect images T0(a), T0(b), T0(c), and T0(d), and a right area 710 can display thumbnail images T0, B0, C0, and D0 of main images captured by a user. In this regard, according to the thumbnail image T0 selected by the user in the right area 710, the multi-effect thumbnail images T0(a), T0(b), T0(c), and T0(d) selected during capturing of the corresponding thumbnail image T0 can be displayed in the left area 700. That is, the thumbnail images T0, B0, C0, and D0 with respect to the main images captured by the user can be displayed in the right area 710, and the multi-effect thumbnail images T0(a), T0(b), T0(c), and T0(d) selected during photographing can be displayed in the left area 700 according to the thumbnail image T0 selected by the user from among the thumbnail images displayed in the right area 710. In the current embodiment, the screen can be divided into two parts, i.e., the right area 710 and the left area 700, but embodiments are not limited thereto. That is, various types of displaying are possible.

A second embodiment for file management can be similar to the first embodiment. However, the second embodiment may be different from the first embodiment in that in the second embodiment, SG108000.JPG as a main image file may not have a thumbnail image corresponding to multi-effect images. That is, SG108000.JPG can record only information about selection of a multi-effect image in an exchangeable image file format (EXIF).

Figure 8:
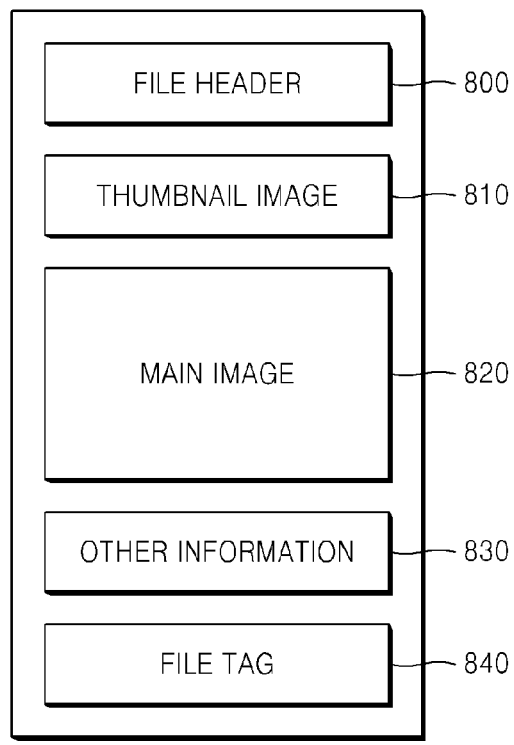
FIGS. 8 through 10 are schematics of a method of managing image data, according to another embodiment.

FIG. 8 is a schematic block diagram illustrating a structure of an EXIF of a main image. The EXIF can include a file header 800, a thumbnail image 810, a main image 820, other information 830, and a file tag 840. In this regard, multi-effect images and multi-effect thumbnail images corresponding to a main image may not be generated according to multi-effects selected by a user, and only information about the multi-effects selected by the user, for example, only information indicating that the user selected Sepia and Black&White, may be recorded in the other information 830. Accordingly, the multi-effect images corresponding to the main image displayed during playback may be generated by using the information about the multi-effect recorded in the other information 830 and may then be displayed. In this regard, the method of displaying multi-effect images may be any of various methods. For example, the method of displaying multi-effect images described with reference to FIG. 7 may also be used.

A third embodiment for file management can be similar to the second embodiment. However, the third embodiment may be different from the second embodiment in that in the third embodiment, multi-effect thumbnail images corresponding to a main image can be generated, but only position information of the thumbnail images can be linked to the other information 830 illustrated in FIG. 8. Accordingly, when the main image is displayed during playback, the linked multi-effect thumbnail images can be called and displayed.

Figure 9:
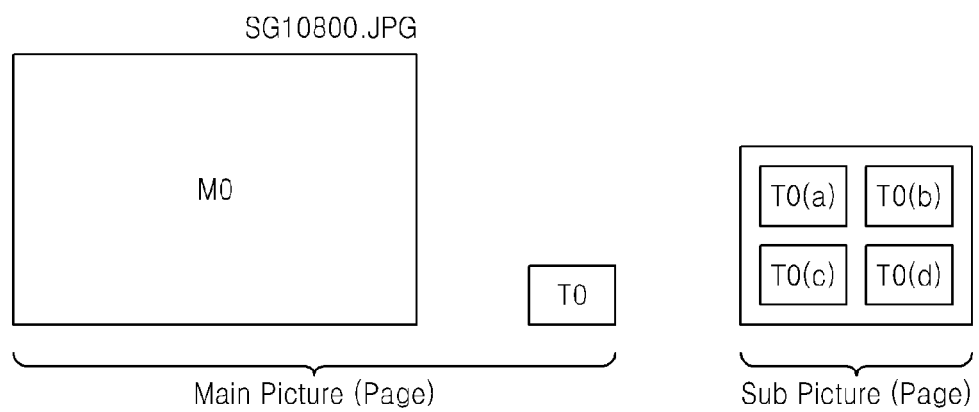

In a fourth embodiment for file management, a sub-picture or a sub-page can be formed by arranging multi-effect thumbnail images in a predetermined array as illustrated in FIG. 9. In this regard, the sub-picture may not necessarily be a thumbnail image and may be represented at a modified resolution base on a main image M0. The resolution of the main image M0 can be greater than those of multi-effect images T0(a), T0(b), T0(c), and T0(d).

As illustrated in FIG. 9, a sub-picture including the four multi-effect images T0(a), T0(b), T0(c), and T0(d) can be formed if the user selects four multi-effects corresponding thereto.

Embodiments are not limited to the sub-picture or the sub-page that has been described. For example, a Multi Picture Format, a Multi Picture File, or a Multi Page Format (MPF) may also be used. The MPF is a standardized multi picture format disclosed in a Standardization Committee of a Camera & Imaging Products Association (CIPA) of Japan. The MPF is included in the exemplary embodiment as a reference.

Figure 10:
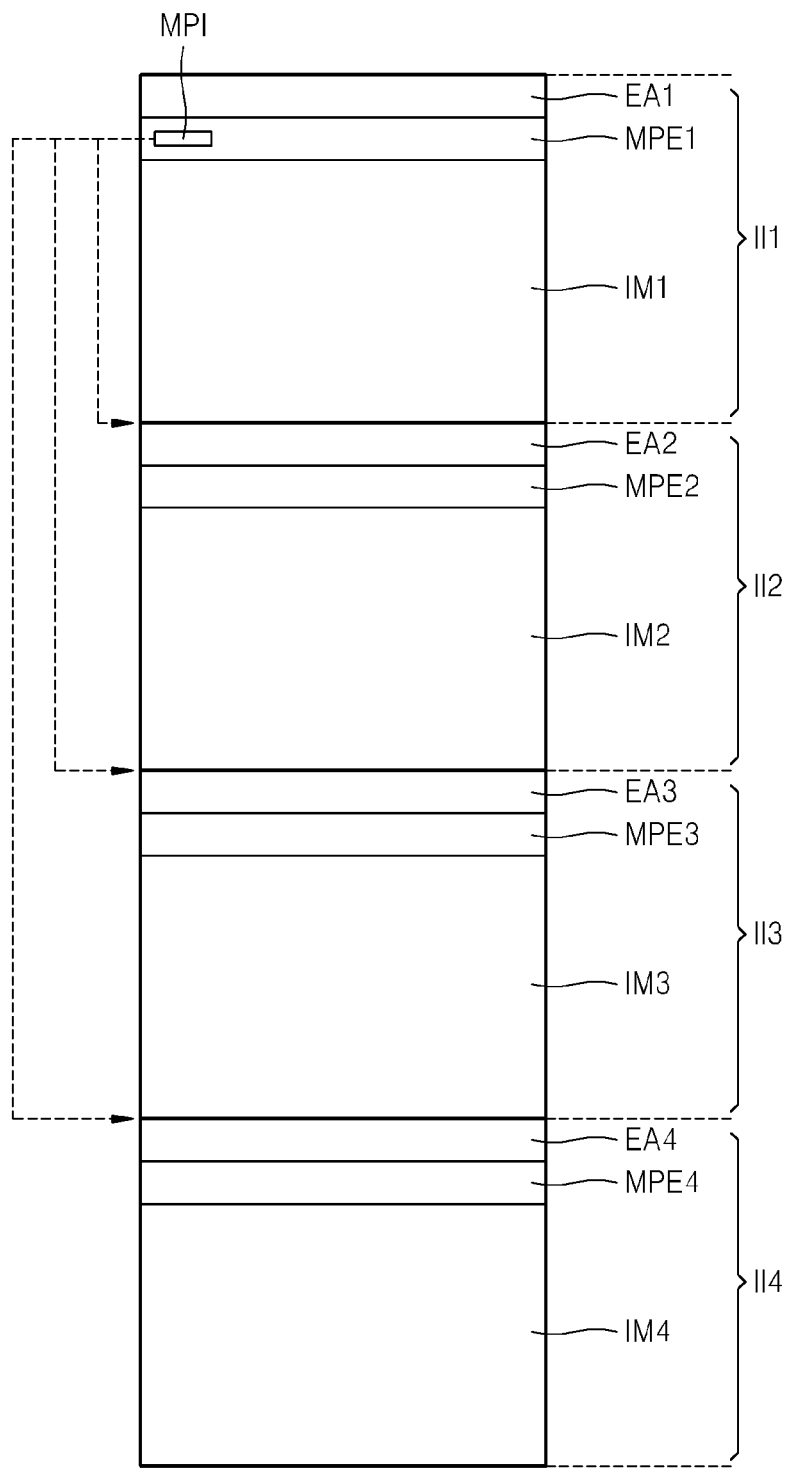

FIG. 10 is a schematic conceptual diagram illustrating a configuration of a multi picture file. In FIG. 10, data regarding four images can be included in one multi picture file.

First part II1 through fourth part II4 each conceptually illustrates a part including data regarding one among a plurality of different images. First, the first part II1 can correspond to a first image, and first image data can be stored in a part indicated by reference numeral IM1. EXIF information of the first image MI can be stored in a part indicated by reference numeral EA1. Multi picture format information and first image unique information can be stored in a part indicated by reference numeral MPE1. The multi picture format information can include information representing a configuration of images stored in the first through fourth parts II1 through II4. A second part II2 can correspond to a second image, and second image data can be stored in a part indicated by reference numeral IM2. EXIF information of the second image can be stored in a part indicated by reference numeral EA2. Multi picture format information and second image unique information can be stored in a part indicated by reference numeral MPE2. A third part II3 can correspond to a third image, and the fourth part II4 can correspond to a fourth image. Configurations thereof can be similar to that of the second part II2. Meanwhile, a multi picture index indicated by reference numeral MPI may be stored in the part indicated by reference numeral MPE1. Accordingly, a main image and multi-effect images of the main image may be managed in a single file structure as illustrated in FIG. 10. However, embodiments are not limited to the above file structure.

Figure 11:
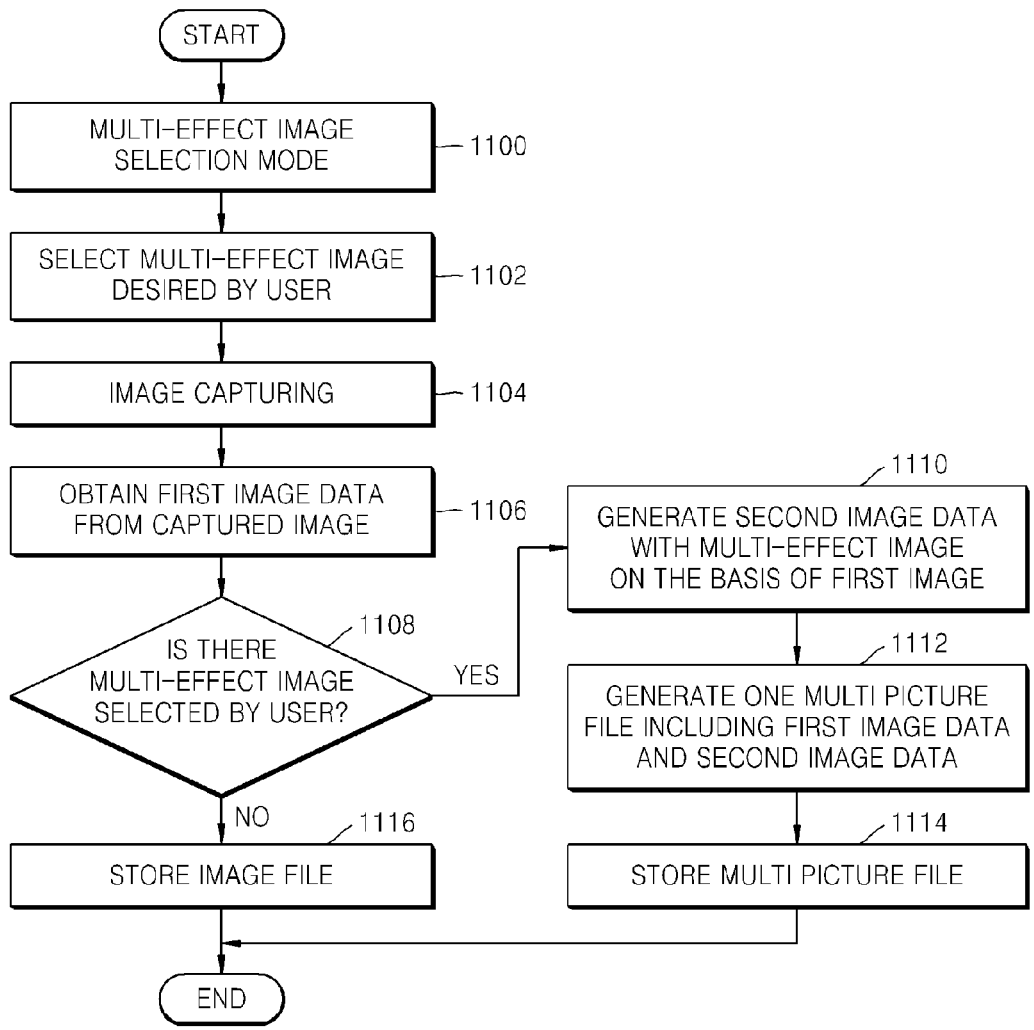
FIG. 11 is a flowchart of a method of controlling a digital photographing apparatus, according to another embodiment.

FIG. 11 is a flowchart for describing a method of controlling a digital photographing apparatus, according to another embodiment.

Referring to FIG. 11, in Operation 1100, a multi-effect image selection mode can be entered. In Operation 1102, a user can select a desired multi-effect image. In Operation 1104, an image can be captured. In Operation 1106, first image data can be obtained from the captured image. In this regard, a thumbnail image may be generated according to the first image data. In Operation 1108, it can be determined whether the user has selected a multi-effect image. If the user has not selected a multi-effect image, the method can proceed to Operation 1116, and the first image data can be stored. Then, the method may end.

In Operation 1108, if the user has selected a multi-effect image, the method can proceed to Operation 1110, and second image data as a multi-effect image selected by the user can be generated using the first image data. In this regard, the second image data may be a thumbnail image or image data having a resolution less than that of the first image data. In Operation 1112, one multi picture file including the first image data and the second image data can be generated. In this regard, embodiments are not limited to the term 'multi picture file'. In Operation 1114, the multi picture file can be stored.

According to embodiments, a main image and images obtained by applying various effects to the main image may be generated through a single instance of photographing.

Also, a convenient interface capable of selecting various effects can be provided to a user. Thus, images having the various effects can be conveniently managed, and a storage capacity can be reduced.

The apparatus described herein may comprise a processor, a memory for storing program data to be executed by the processor, a permanent storage such as a disk drive, a communications port for handling communications with external devices, and user interface devices, including a touch panel, keys, buttons, etc. When software modules are involved, these software modules may be stored as program instructions or computer readable code executable by the processor on a non-transitory computer-readable media, random-access memory (RAM), read-only memory (ROM), CD-ROMs, DVDs, magnetic tapes, hard disks, floppy disks, and optical data storage devices. The computer readable recording medium can also be distributed over network coupled computer systems so that the computer readable code is stored and executed in a distributed fashion. This media can be read by the computer, stored in the memory, and executed by the processor. Also, using the disclosure herein, programmers of ordinary skill in the art to which the invention pertains can easily implement functional programs, codes, and code segments for making and using the invention.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism", "element", "means", and "configuration" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The invention is not limited to the described order of the steps. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the present invention.

While the invention has been particularly shown and described with reference to exemplary embodiments thereof, it will be understood by those of ordinary skill in the art that various changes in form and details may be made therein without departing from the spirit and scope of the invention as defined by the following claims. Therefore, the scope of the invention is defined not by the detailed description of the invention but by the following claims, and all differences within the scope will be construed as being included in the invention.

What is claimed is:

1. A method of controlling a digital photographing apparatus, the method is performed by the following operations in the following order:
   providing, by the digital photographing apparatus, a multi-effect image setting screen on a display unit of the digital photographing apparatus;
   receiving, by the digital photographing apparatus, a plurality of multi-effect selections that are performed by user selection signals;
   obtaining first image data from a digital input image;
   generating second image data based on the first image data according to the multi-effect selections; and
   displaying simultaneously the first image data in a first area and the second image data in a second area on the display unit as a plurality of images each image corresponding to one of the selected plurality of multi-effects applied to the first image data.

2. The method of claim 1, wherein the multi-effect selections are saved and applied to additional first images.

3. The method of claim 2, further comprising displaying a multi-effect image setting menu.

4. The method of claim 3, wherein the displaying of the multi-effect image setting menu comprises:
   displaying a display area of the digital photographing apparatus by dividing the display area into a first area and a second area;
   displaying one or more multi-effect images selectable by the user in the first area; and
   displaying in the second area one or more images selected by the user from among the one or more multi-effect images displayed in the first area.

5. The method of claim 3, wherein the displaying of the multi-effect image setting menu comprises displaying the multi-effect images selectable by a user by grouping the multi-effect images according to a category.

6. The method of claim 1, wherein the second image data is a plurality of thumbnail images generated according to the multi-effect selections that are previously set.

7. The method of claim 1, further comprising:
   generating a first thumbnail image from the obtained first image data;
   generating a second thumbnail image from the first thumbnail image according to the multi-effect selections that are previously set; and
   storing one or more of the first image data, the first thumbnail image, and the second thumbnail image.

8. The method of claim 7, further comprising displaying the first thumbnail image and the second thumbnail image,
   wherein the displaying comprises:
   displaying a display area of the digital photographing apparatus by dividing the display area into a first area and a second area;
   displaying the first thumbnail image in the first area; and
   displaying the second thumbnail image in the second area.

9. The method of claim 8, wherein the second thumbnail image is displayed in the second area with respect to the first thumbnail image displayed in the first area, according to a selection of a user.

10. The method of claim 1, further comprising:
generating a first thumbnail image from the obtained first image data;
storing information about the multi-effect selections that are previously set in an EXIF of the first image data; and
when the first image data and the first thumbnail image are displayed, generating a second thumbnail image from the first thumbnail image according to the multi-effect selections that are previously set.

11. The method of claim 10, further comprising storing position information of the generated second thumbnail image in the EXIF of the first image data.

12. The method of claim 1, further comprising storing the first image data and the second image data as one image file.

13. The method of claim 12, wherein a resolution of the first image data is greater than that of the second image data.

14. A digital photographing apparatus comprising:
a digital signal processing unit that performs the following operations in the following order:
receives a plurality of multi-effect selections that are performed by user selection signals;
obtains first image data from a digital input image;
generates second image data based on the first image data according to the multi-effect selections; and
displaying simultaneously the first image data in a first area and the second image data in a second area on the display unit as a plurality of images each image corresponding to one of the selected plurality of multi-effects applied to the first image data.

15. The digital photographing apparatus of claim 14, wherein the digital signal processing unit comprises a multi-effect image setting unit that sets a multi-effect image according to a user's selection.

16. The digital photographing apparatus of claim 14, wherein the digital signal processing unit comprises a control unit that controls displaying of a display area of the digital photographing apparatus by dividing the display area into a first area and a second area, displaying of multi-effect images selectable by a user in the first area, and displaying of in the second area one or more images selected by the user from among the multi-effect images displayed in the first area.

17. The digital photographing apparatus of claim 14, wherein the digital signal processing unit comprises a thumbnail generating unit that generates the second image data as a thumbnail image from the first image data according to the multi-effect selections that are previously set.

18. The digital photographing apparatus of claim 14, wherein the digital signal processing unit comprises:
a thumbnail generating unit that generates a first thumbnail image from the obtained first image data and that generates a second thumbnail image from the first thumbnail image according to the multi-effect selections that are previously set; and
a control unit that controls storing of one or more of the first image data, the first thumbnail image, and the second thumbnail image.

19. The digital photographing apparatus of claim 18, wherein the control unit controls displaying of one or more of the first thumbnail image and the second thumbnail image, displaying of a display area of the digital photographing apparatus divided into a first area and a second area, and displaying of the first thumbnail image in the first area and the second thumbnail image the second area.

* * * * *